United States Patent
See et al.

(10) Patent No.: US 7,249,247 B2
(45) Date of Patent: *Jul. 24, 2007

(54) COMMON FEATURE MODE FOR MICROPROCESSORS IN A MULTIPLE MICROPROCESSOR SYSTEM

(75) Inventors: Valerie R. See, Snohomish, WA (US); David W. Williams, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

This patent is subject to a terminal disclaimer.

(21) Appl. No.: 10/940,394

(22) Filed: Sep. 13, 2004

(65) Prior Publication Data

US 2005/0033950 A1    Feb. 10, 2005

Related U.S. Application Data

(63) Continuation-in-part of application No. 09/547,364, filed on Apr. 11, 2000, now Pat. No. 6,792,529.

(51) Int. Cl.
G06F 1/24 (2006.01)
G06F 15/177 (2006.01)

(52) U.S. Cl. .................................... 712/229

(58) Field of Classification Search ............. 712/229; 714/12, 4, 7; 713/1, 100, 375
See application file for complete search history.

(56) References Cited

U.S. PATENT DOCUMENTS

| | | | | |
|---|---|---|---|---|
| 4,992,933 | A | 2/1991 | Taylor | 712/22 |
| 5,153,897 | A | 10/1992 | Sumiyoshi et al. | 375/222 |
| 5,475,856 | A | 12/1995 | Kogge | 712/20 |
| 5,574,899 | A | 11/1996 | Kinoshita | 707/1 |
| 5,579,509 | A | 11/1996 | Furtney et al. | 703/27 |
| 5,794,066 | A | 8/1998 | Dreyer et al. | 712/32 |
| 5,889,977 | A | 3/1999 | Schultz | 703/27 |
| 5,918,061 | A | 6/1999 | Nikjou | 713/324 |
| 6,009,274 | A * | 12/1999 | Fletcher et al. | 717/173 |
| 6,079,013 | A | 6/2000 | Webb et al. | 712/227 |
| 6,360,362 | B1 * | 3/2002 | Fichtner et al. | 717/168 |
| 6,453,344 | B1 | 9/2002 | Ellsworth et al. | 709/220 |
| 6,457,075 | B1 | 9/2002 | Koutsoures | 710/35 |
| 6,748,526 | B1 * | 6/2004 | Thangadurai | 713/1 |

(Continued)

Primary Examiner—Eric Coleman
(74) Attorney, Agent, or Firm—Workman Nydegger (57) ABSTRACT

A mechanism whereby a set of microprocessors may be set to a common mode in which the microprocessors utilize one or more features that are common to all microprocessors. The common mode facilitates proper multiprocessor operation and permits a fix (e.g., a microcode patch) to be applied to each of the microprocessors based on this common mode. More particularly, at system startup, firmware or software can detect whether microprocessors are set to run in different modes (e.g., steppings) in a multiprocessor system. If not, the microprocessors are allowed to run in their normal mode, such as by writing a particular value (e.g., zero) to a configuration register associated with each microprocessor. If features are mixed, a different value can be written, (e.g., one), which tells each microprocessor to revert to a common mode of operation for that family of microprocessors, such as corresponding to a common stepping and/or clock speed. A common set of microcode patches may be downloaded to the microprocessors. Alternatively, the various microprocessors may also be instructed to run in a particular mode that emulates a particular stepping, e.g., by writing into the configuration register or registers a number between one and M that corresponds to a common stepping among the microprocessors.

35 Claims, 9 Drawing Sheets

U.S. PATENT DOCUMENTS 7,080,242 B2 * 7/2006 Morris .......................... 713/1
2003/0217253 A1 * 11/2003 Chen et al. .................... 713/1
2003/0236970 A1 * 12/2003 Palmer et al. ................. 713/1

* cited by examiner

COMMON FEATURE MODE FOR MICROPROCESSORS IN A MULTIPLE MICROPROCESSOR SYSTEM

This application is a continuation in part of patent application Ser. No. 09/547,364 filed Apr. 11, 2000 now U.S Pat. No. 6,792,529.

FIELD OF THE INVENTION

The present invention generally relates to computer systems, and more particularly to microprocessors for use in a multiple microprocessor computer system.

BACKGROUND OF THE INVENTION

Contemporary operating systems (e.g., Microsoft Windows® 2000/NT® operating systems and the like) can change and/or fix behavioral errors ("errata") in microprocessor hardware by downloading microcode patches to the microprocessor. The microcode patch that is downloaded is specific to the stepping (version) of the microprocessor, and serves to fix known behavior problems and errata for the particular stepping.

Many current multiprocessor operating systems operate on the assumption that all microprocessors in a multiprocessor system are of the same stepping and include the same errata. In addition, there is an expectation within many current operating systems that all microprocessors in the multiprocessor system are sourced from the same microprocessor manufacturer, are set to run at the same clock speed, and have the same feature set (e.g., on-chip or in-package cache sizes and the like). Putting more than one microprocessor stepping in a system may result in anomalous behavior including system stalls, crashes and boot failures.

In addition, when the steppings of multiple microprocessors are different, some operating systems download a microcode patch for fixing the errata on only one microprocessor stepping, and that microcode patch may not be appropriate to fix the errata on other microprocessors in the system, or may even cause instability for the other microprocessors. For example, in a multiprocessor system running a Windows NT®-based operating system, the same microcode patch is downloaded to all microprocessors based upon the microcode needed by the bootstrap microprocessor. If the bootstrap microprocessor is an earlier stepping than that of another microprocessor in the system, the fixes are normally already built into the hardware in the later microprocessor stepping. Although microprocessor designers work with a goal of ensuring that mixed-stepping systems, in which the lowest stepping is the bootstrap microprocessor, can function (i.e. that a "later" stepping can have earlier microcode patches applied to it and still function properly), there are cases where applying early microcode to later-stepping microprocessors appears to cause system instability. If the bootstrap microprocessor is a later stepping than that of another microprocessor in the system, the fixes applicable to the new microprocessor (if any) are normally inadequate to address the errata in the earlier microprocessors.

SUMMARY OF THE INVENTION

Briefly, the present invention is directed to a mechanism whereby a set of microprocessors in a multiprocessor system may be selectively set to a common mode, whereby the microprocessors utilize one or more features that are common to other microprocessors in the system. The common mode permits multiprocessor operation and permits a fix (e.g., a microcode patch) to be applied to each of the microprocessors based on this common mode. More particularly, at system startup, firmware or software detects whether microprocessors set to run in different modes (e.g., steppings) are present in a system. If not, the microprocessors are allowed to run in their normal mode, such as by leaving by default or writing (preferably in a protected operation) a particular value (e.g., zero) to a configuration register of each microprocessor. If modes are mixed, a different value can be written, (e.g., one), which tells each microprocessor to revert to a common mode of operation for that family of microprocessors, to which a common set of fixes may be applied. Alternatively, the various microprocessors may also be instructed to run in a particular mode that emulates a particular stepping, e.g., by writing into the configuration register or registers a number between one and M that corresponds to a common stepping among the set of microprocessors in a multiprocessor system.

In addition, contemporary microprocessors may run in different modes with respect to instruction sets, e.g., a 64-bit processor may run in a 32-bit mode. Even in systems in which the processors are not in the same system, but rather are decentralized and networked or otherwise connected in a distributed computing environment, there are situations in which having certain processors run in a common mode is advantageous. An intermediary collects the information on the processors and instructs the processors as to a mode in which to run. The intermediary may be system firmware or one processor of a multiprocessor system. In a separated (e.g., networked) environment, the intermediary may be one of the processors, or may be an independent system such as a server, web service, driver and so forth.

Still further, various types of processors may change modes to better interoperate with one another and/or to better operate in certain scenarios. To this end, not only CPUs may change modes, but Graphics Processing Units (GPUs), Programmable Logic Arrays (PLAs), Digital Signal Processors (DSPs) and so forth are likewise configurable to operate in different modes. Again, an intermediary, which may be firmware, any one of the processors and/or an independent mechanism, controls the modes to improve interoperability between processors. For example, a graphics processor may be configured to operate in a mode that more efficiently handles streaming media when appropriate.

Other advantages will become apparent from the following detailed description when taken in conjunction with the drawings, in which:

DETAILED DESCRIPTION

Exemplary Operating Environment

Figure 1:
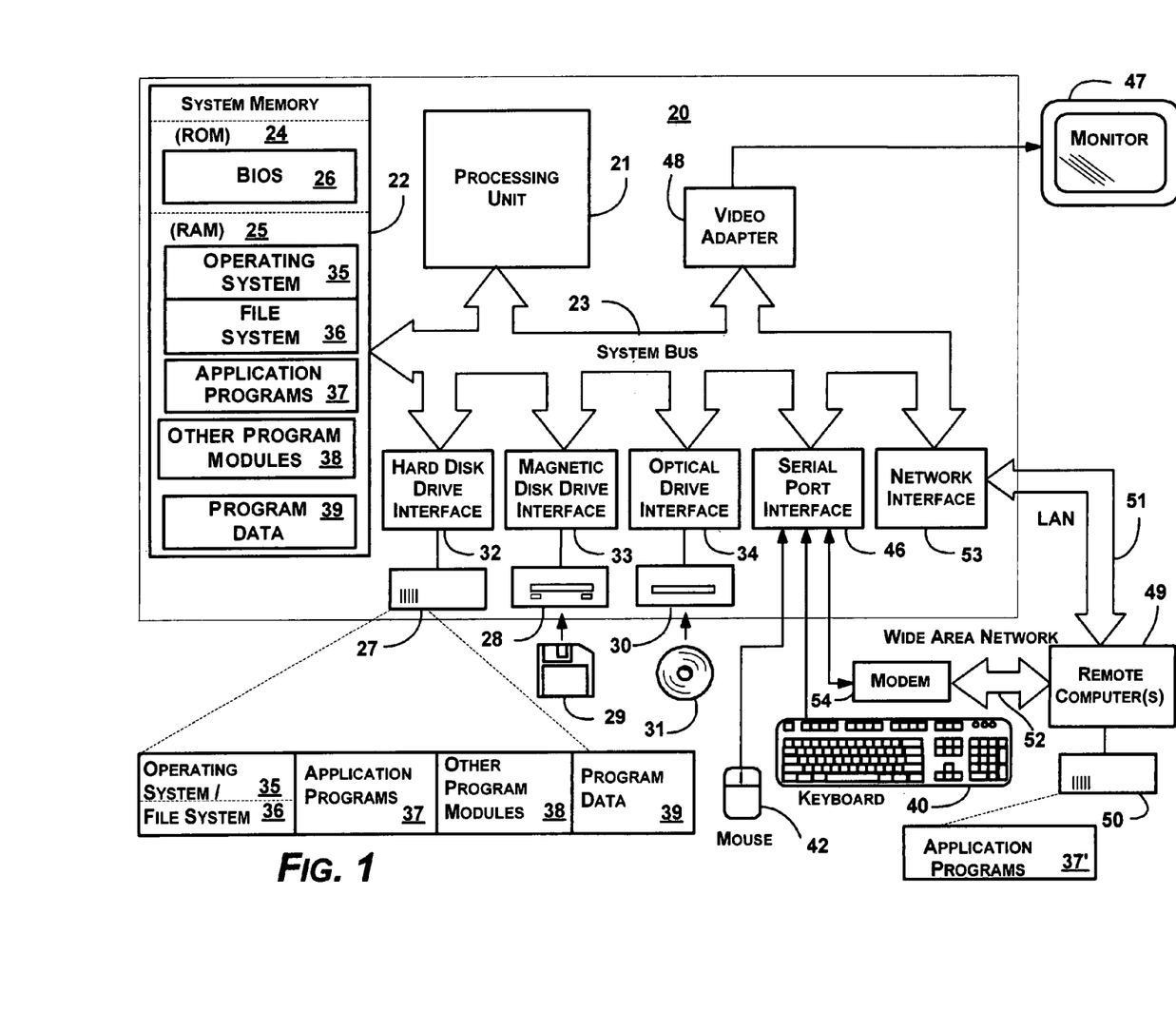
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system 36 therein and/or associated therewith), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Corresponding Processor Modes

In general, the present invention is directed to a mechanism whereby a plurality of microprocessors may be set to a common mode so that the plurality of microprocessors each utilize steppings, clock speeds and/or other features that are common to all of the microprocessors. In accordance with one aspect of the present invention, a microprocessor is provided with the features of at least one earlier version of the microprocessor so that, if desired, the microprocessor may be set to operate in the mode of (i.e., using the features of) the earlier version. Different versions of microprocessors in a multiprocessor system may thereby be set to operate in the same mode.

Figure 2:
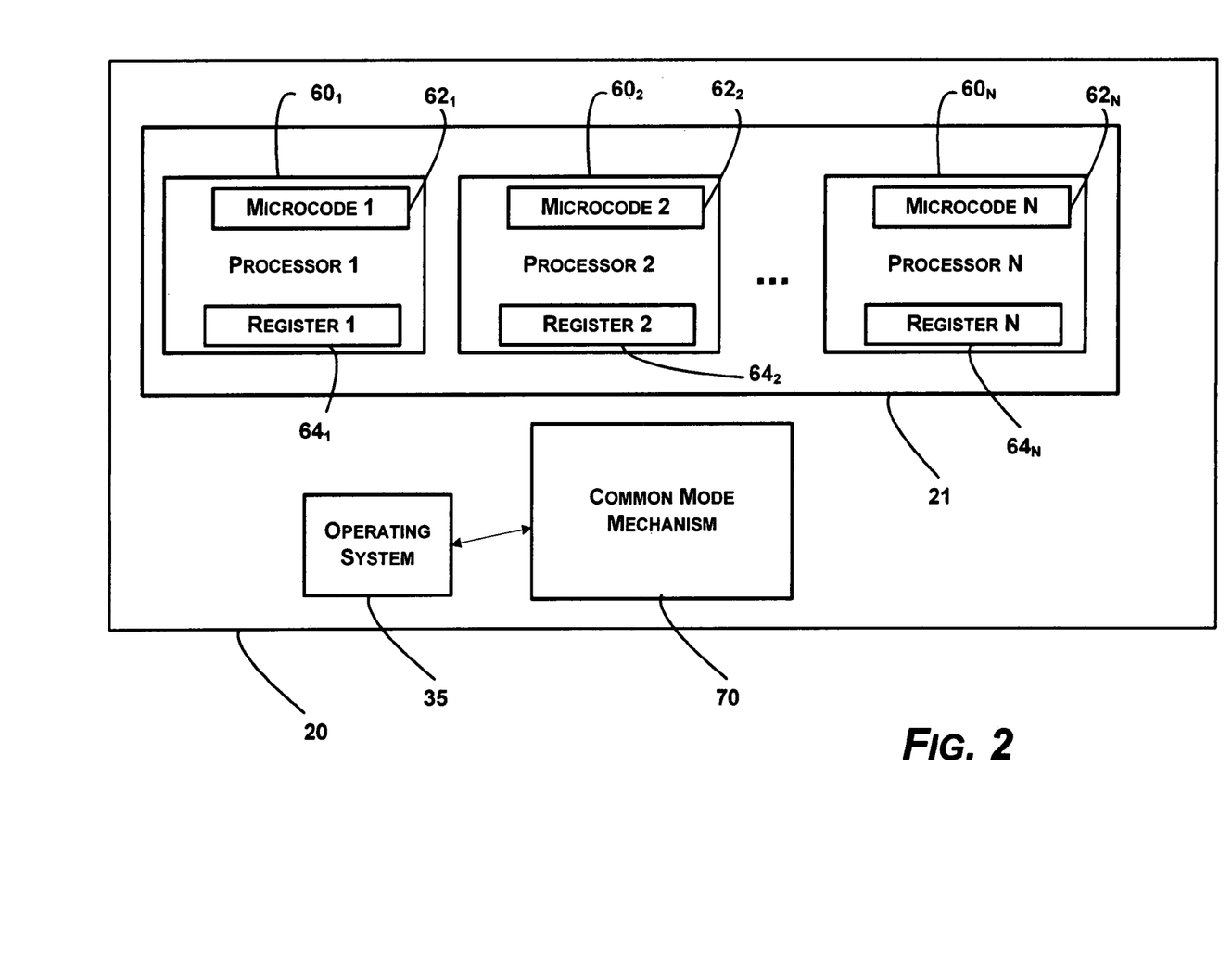
FIG. 2 is a block diagram representing a general architecture for a mechanism for setting multiple microprocessors to a common mode in accordance with one aspect of the present invention.

FIG. 2 shows a general architecture of a computer system (e.g., the personal computer system 20) in which a common feature mode may be set for microprocessors in a multiple microprocessor system. The processing unit 21 of the computer system 20 includes a plurality of microprocessors $60_1$, $60_2 \ldots 60_N$, each of which includes microcode $62_1$, $62_2 \ldots 62_N$ and a register $64_1$, $64_2 \ldots 64_N$.

A common mode mechanism 70 is included within, or alternatively is associated with, the operating system 35. The common mode mechanism 70 is associated with each of the microprocessors 60. The common mode mechanism 70 detects the presence of multiple microprocessors in the computer system 20, and detects the available modes (e.g., steppings, clock speeds, or other features) of the microprocessors. The detections are preferably performed at system startup or any time power is removed and reapplied to the microprocessors (a "power cycle"), but the detections may be performed at other times.

The available modes for the microprocessors may be detected in a variety of different ways, but in one implementation are requested via execution of a CPUID (processor identification) instruction on each microprocessor. Execution of the CPUID may return each microprocessor's family ID and clock speed, model ID, and stepping ID, as well as the feature set available for the microprocessor, which includes enhancements, extensions, cache size, and the like. The microprocessor's manufacturer and/or the CPUID instruction may provide other information as dictated. The common mode mechanism may utilize other ways of retrieving available modes, such as by requesting the information via the operating system 35, which in turn may use a CPUID instruction or another implementation method to retrieve available modes.

In accordance with one aspect of the invention, if the common mode mechanism 70 detects that the microprocessors in a system are not the same mode (e.g., different steppings), then the common mode mechanism sets the microprocessors 60 to a common mode. To this end, a processor designer and/or manufacturer may utilize a variety of design alterations to provide a microprocessor with features of a previous version so that the microprocessor may be set to operate in the mode of the previous version. For example, additional circuitry and/or additional gate sets may be provided so as to provide access to the features of the previous version. Alternatively, a complete additional set of circuitry may be provided, such as by stacking two microprocessors on top of or beside one another. A microprocessor may also alter its behavior via software or settings, thereby using the same circuitry to operate in a different mode (e.g., reduce clock speed so as to allow microprocessors at different clock speeds to operate at a common speed).

Although the common mode mechanism 70 is shown as being separate from the microprocessors, the common mode mechanism may alternatively be included as part of the microprocessors' microcodes 62. Alternatively, the common mode mechanism 70 may be included in platform firmware, operating system software, or any other software that is capable of detecting multiple microprocessors and the available modes of those microprocessors. In addition, if desired, separate mechanisms may be used to detect multiple microprocessors and the available modes of the microprocessors.

If desired, the operating system 35 may include software including the features of the common mode mechanism 70, and thus may serve as a double-check to ensure that all microprocessors in a system are operating in the same mode. To perform this function, the operating system 35 may include a mechanism similar to the common mode mechanism 70, which detects the presence of multiple microprocessors and the modes of the microprocessors, and, if necessary, changes the different modes to a common mode. If desired, the operating system 35 may override mode settings by the common mode mechanism 70.

Preferably, setting the microprocessors to a common mode by the common mode mechanism 70 occurs as a protected operation. In accordance with one aspect of the present invention, once a common mode is set for multiple microprocessors, the common mode would survive through sleep states, halts, or resets, and is only reset upon power cycling of the microprocessors. Alternatively, the microprocessors may be reset by execution of another protected operation via the common mode mechanism. As is described further below, in one embodiment, to set the mode of a microprocessor, a particular value is written (preferably in a protected operation) to a configuration register of the microprocessor. The configuration register may be maintained in the registries 64 for the microprocessor, or may be maintained separately (e.g., in the system memory 22). As can be readily appreciated, the microprocessors can access separate registries or can each access one common registry in the system.

Figure 3:
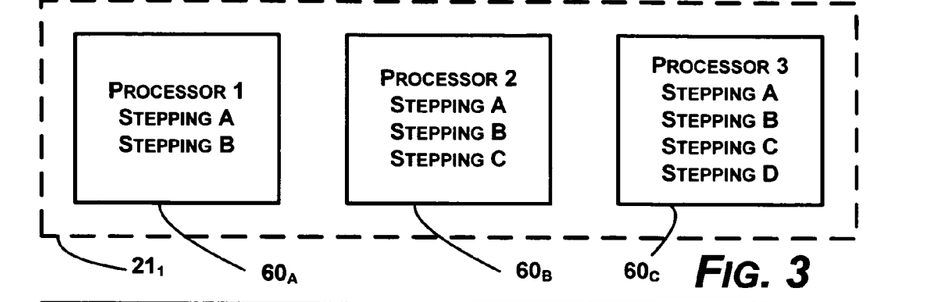
FIG. 3 is a representation of a processing unit having multiple microprocessors.

FIG. 3 shows an example of a processing unit $21_1$ having three microprocessors $60_A$, $60_B$, and $60_C$. These microprocessors are from the same family of microprocessors, but are different versions. However, as described below, the present invention may be implemented across microprocessor families, as long as the microprocessors from the different families may be set to operate in a corresponding mode. Moreover, as described below, the types of microprocessors need not be the same, e.g., certain CPUs, Graphics Processing Units (GPUs), Programmable Logic Arrays (PLAs), Digital Signal Processors (DSPs) and so forth likewise are configurable to operate in different modes so that, for example, they better interoperate with one another.

In the example shown in FIG. 3, microprocessor $60_A$ is the earliest version of the three, and microprocessor $60_C$ is the latest. The more recent versions of the microprocessors (i.e., microprocessors $60_B$ and $60_C$) are provided with the features (in this example, steppings) of earlier versions of the microprocessor family. Thus, in the example shown, the first microprocessor $60_A$ includes two steppings: stepping A and stepping B. The second microprocessor includes three steppings: stepping A, stepping B, and stepping C. The third microprocessor includes four steppings: stepping A, stepping B, stepping C and stepping D. Each of the microprocessors has different "normal mode" steppings. As used herein, "normal mode" means the most-recent mode supplied on a microprocessor, which in the case of steppings, is the most-recent stepping. Thus, assuming a temporal order of the steppings of A, B, C, D, the normal mode stepping for the microprocessor $60_A$ is stepping B, the normal mode stepping for the microprocessor $60_B$ is stepping C, and the normal mode stepping for the microprocessor $60_C$ is stepping D.

In keeping with the present invention, so that all the microprocessors may be set to the same mode, the microprocessors having more recent normal mode steppings (microprocessors $60_B$ and $60_C$) also include at least one earlier stepping that is common with at least one stepping available on earlier versions of microprocessors in the family. The common stepping may be the same as the normal mode stepping of the earliest version microprocessor. For example, one stepping that is common to the microprocessors $60_A$, $60_B$, and $60_C$ is the stepping B, which is the normal mode stepping for the earliest version microprocessor $60_A$. Alternatively, the common stepping may be a stepping, such as stepping A, which is included on all of the microprocessors and that is not the normal mode stepping of any of the microprocessors.

A mode, such as corresponding to a stepping, may be defined at the introduction of a microprocessor family that is to be included on the first and all future versions of microprocessors in the family. The mode, called a "family common mode", is a default common mode that provides a minimal predictable set of features (e.g., stepping and/or clock speed), capabilities, and errata that are defined at the introduction of a new microprocessor design and/or family, and which remain invariant throughout the life of the microprocessor family. This common family mode provides a mode to which all microprocessors in the family may be set, so that when microprocessors with different modes are detected, the common family mode may be set as the mode for all the microprocessor. For example, the stepping A may be the family common mode for the family of microprocessors 60 shown in FIG. 3.

If the family common mode is utilized, then a family common mode register (e.g., a bit value within the registry 64) may be utilized to set all of the microprocessors to operate in the family common mode. For example, a single bit within the registry 64 may represent whether the microprocessor operates in normal mode or family common node. In one embodiment, setting the bit to "0" (or leaving it at zero) causes the microprocessor to operate in the normal mode, while setting the bit to "1" causes the microprocessor to operate in the family common mode. In the example shown in FIG. 4, the microprocessors $60_A$, $60_B$, and $60_C$ are shown in the top of the figure in normal mode, with the bit within the family common mode register (FCMR) set to "0".

Figure 4:
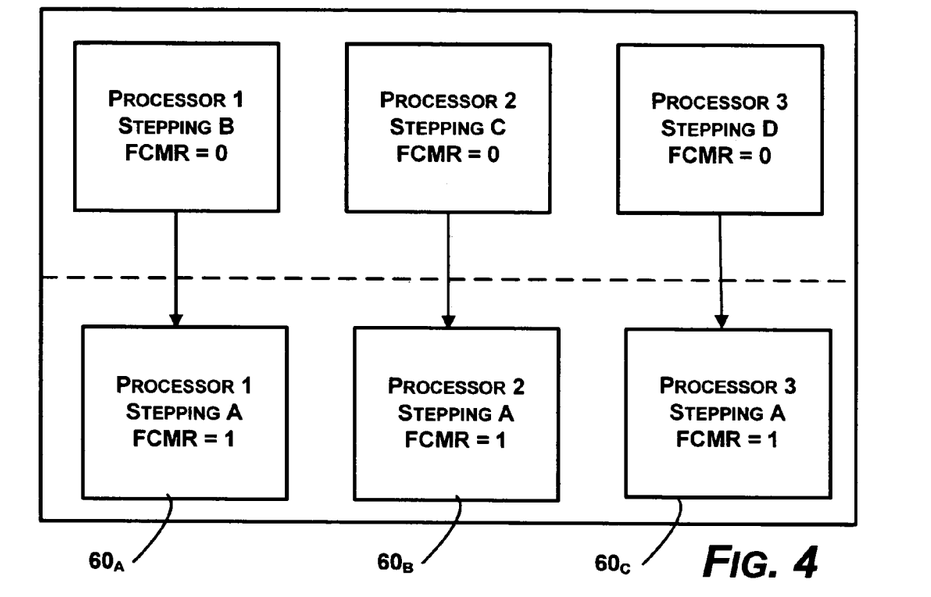
FIG. 4 is a representation of the microprocessors of FIG. 3 being set to a family common mode.

In operation, the common mode mechanism 70 senses that there are three different microprocessors within the processing unit 21, and that these three different microprocessors have different modes (i.e., different normal mode steppings). The common mode mechanism 70 sets the microprocessors to the family common mode by setting the bit value within the family common mode registry to "1". Each of the microprocessors is thus switched to operate in the family common mode (i.e., stepping A).

Figure 6:
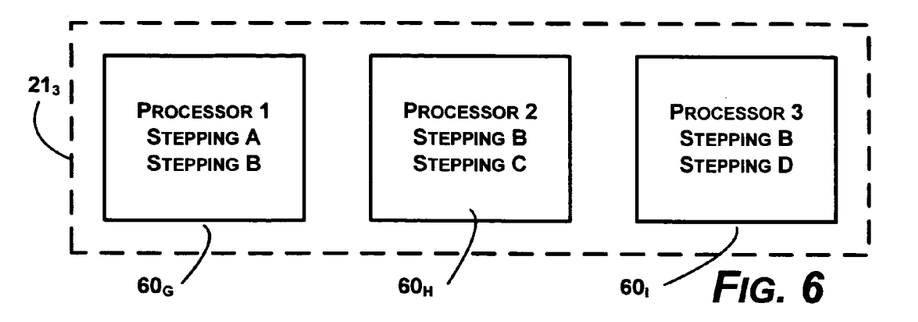
FIG. 6 is a representation of yet another processing unit having multiple microprocessors.

Note that the family common mode need not be the earliest stepping of a microprocessor family. For example, a microprocessor manufacturer may choose not to support family common mode in a processor below a certain stepping. A microprocessor manufacture may, for example, define one stepping as a stepping that will be included on all future steppings. Steppings that are produced intermediate the defined stepping and the normal mode stepping for the microprocessor may not be included. As one example, the microprocessors $60_G$, $60_H$, and $60_I$ in FIG. 6 include the stepping B and the normal mode for the microprocessor. Other common modes may be supplied as desired.

Figure 5:
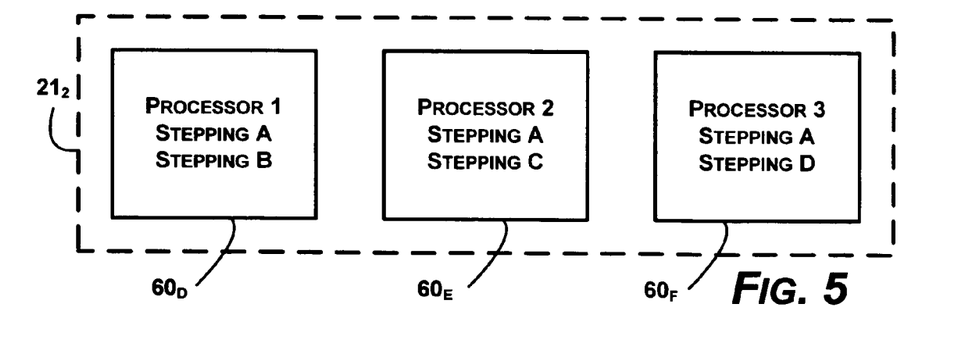
FIG. 5 is a representation of another processing unit having multiple microprocessors.

As can be understood, if the family common mode operation is utilized, there is not a need for intermediate steppings in a microprocessor. For example, for the microprocessors $60_B$ and $60_C$ shown in FIG. 3, only the normal mode stepping for the microprocessor and stepping A is needed so that the microprocessors may operate in normal mode or family common mode. Therefore, each of the microprocessors may include only the normal mode stepping and the family common mode stepping, so that microprocessors 60D, 60E, and 60F shown in FIG. 5 may be utilized to provide the same family and normal modes as the microprocessors in FIG. 3. As can be readily appreciated, having only two modes per microprocessor simplifies microprocessor circuitry design.

Upon determining that microprocessors are operating in different modes, the common mode mechanism may set the microprocessors to a mode other than family common mode. For example, each of the microprocessors in a processing unit may be set to a most-recent common mode for the microprocessors. That is, the most-recent mode (e.g., stepping) that is available on all of the microprocessors in the processing unit 21. In the example shown in FIG. 3, the most-recent common stepping is the stepping B.

Registry values (e.g., within the registries 64) may also be utilized to set the microprocessors to a most-recent common mode. For example, a registry value may be entered in a most-recent common mode registry for each that corresponds to a common mode (e.g., stepping) among the microprocessors. The size of the most-recent common mode register may be determined based upon the number of alternate modes available to the microprocessor. For example, a single bit within the registry is sufficient for only two possible modes, two bits is sufficient for four possible modes, and so forth. In accordance with one embodiment, setting the bit value for the most-recent common mode registry to "0" causes a microprocessor to operate in normal mode (e.g., the normal mode stepping) for the microprocessor. Writing a value in the most-recent common mode registry that is not equal to "0" tells the microprocessor the mode in which to operate. In other words, numbers between one and M may be entered in the most-recent common mode registry that correspond to other (non-normal) modes available in the family of microprocessors. For example, with the microprocessors shown in FIG. 3, the values "1" to "4" may be used to represent the steppings A to D, respectively. Note that a "0" would indicate normal mode operation, and thus the stepping would depend on the microprocessor. The bit value within the registry 64 may be set to a value of 2, indicating that the second stepping available in the family of microprocessors (i.e., stepping B) is the mode in which the microprocessor is to operate. The common mode mechanism 70 sets the bit value in the register to a binary equivalent of the second stepping (e.g., "10" or "010" binary). As can be understood, bit values in the registry 64 may be related to modes (e.g., steppings) in any desired manner.

Figure 7:
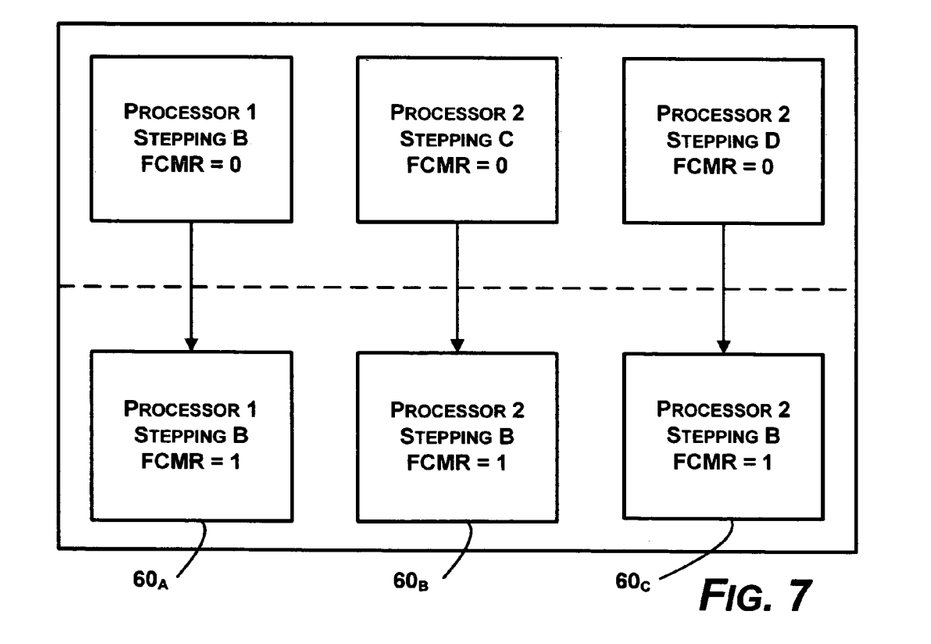
FIG. 7 is a representation of the microprocessors of FIG. 3 being set to a most-recent common mode.

An example showing a change of microprocessors 60A, 60B, and 60C from normal mode to common mode is shown in FIG. 7. The microprocessors 60A, 60B, and 60C are originally in their normal modes (stepping B, C, and D, respectively), with the most-recent common mode registry value at "0". The common mode mechanism 70 writes into the registry the most-recent common mode registry value (MRCMR) of two ("2"), so that the microprocessors 60A, 60B, and 60C each operate in stepping B.

Setting microprocessors in a multiprocessor system to a common mode permits stable multiprocessor operation, and/or masking of differences in errata and/or feature sets. For example, by setting all microprocessors to the same stepping, a single microcode patch may be downloaded to fix errata for multiple microprocessors.

Figure 8:
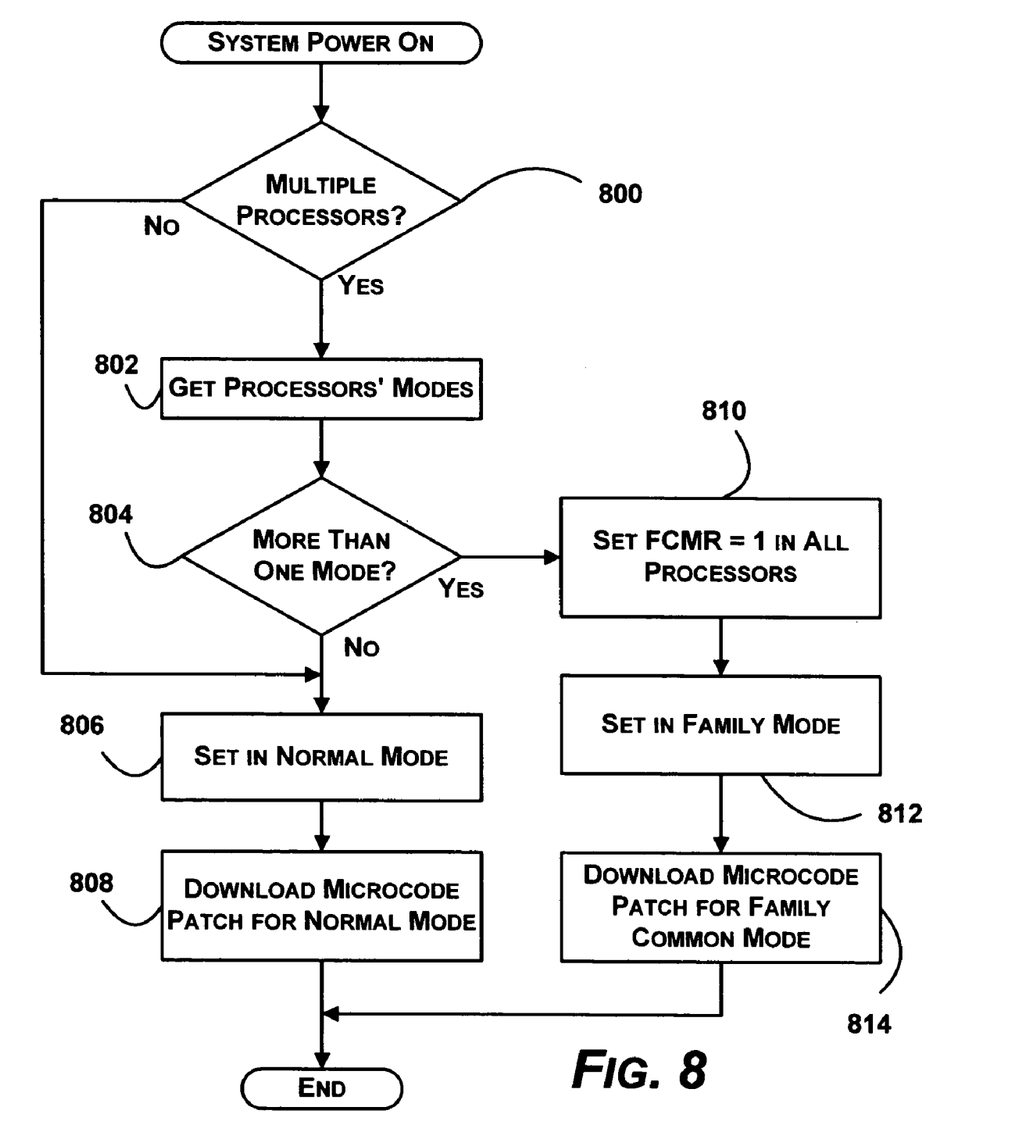
FIG. 8 is a flow diagram generally representing the steps for setting multiple microprocessors to a family common mode in accordance with one aspect of the present invention.

Turning now to an explanation of the operation of the present invention, FIG. 8 shows a general overview of a process for setting multiple microprocessors to a family common mode in accordance with one aspect of the present invention. Beginning at step 800, the common mode mechanism 70 detects whether there are multiple microprocessors in the computer system 20. As discussed above, the common mode mechanism 70 may detect multiple microprocessors at any time, but detection at startup or power cycling of the computer system is a preferred embodiment of present invention. If only one microprocessor is detected, then step 800 branches to step 806, where operation of the microprocessor remains in normal mode (or, if operating in a different mode, is set to normal mode by the common mode mechanism 70).

If the common mode mechanism 70 detects multiple microprocessors, then step 800 branches to step 802 where the common mode mechanism detects the modes for the microprocessors. If the microprocessors are the same normal mode, then step 804 branches to step 806 where the microprocessors are set to operate in their normal modes. Setting of the microprocessors to the normal mode may be accomplished, for example, by setting a family common mode registry to, or leaving the family common mode registry at, "0". A microcode patch for the normal mode is then downloaded to the microprocessors, if available (step 808).

If, however, there is more than one mode detected by the common mode mechanism 70, step 804 branches to step 810 where the common mode mechanism sets all of the microprocessors to run in a family common mode by setting a family common mode registry to "1". The microprocessors then run in the family common mode (step 812). Note that if one or more microprocessors are unable to operate in family common mode, then the computer system 20 can take action such as warn of instability, shut down, and the like. A microcode patch for the family common mode is then downloaded to the microprocessors, if available (step 814).

Figure 9:
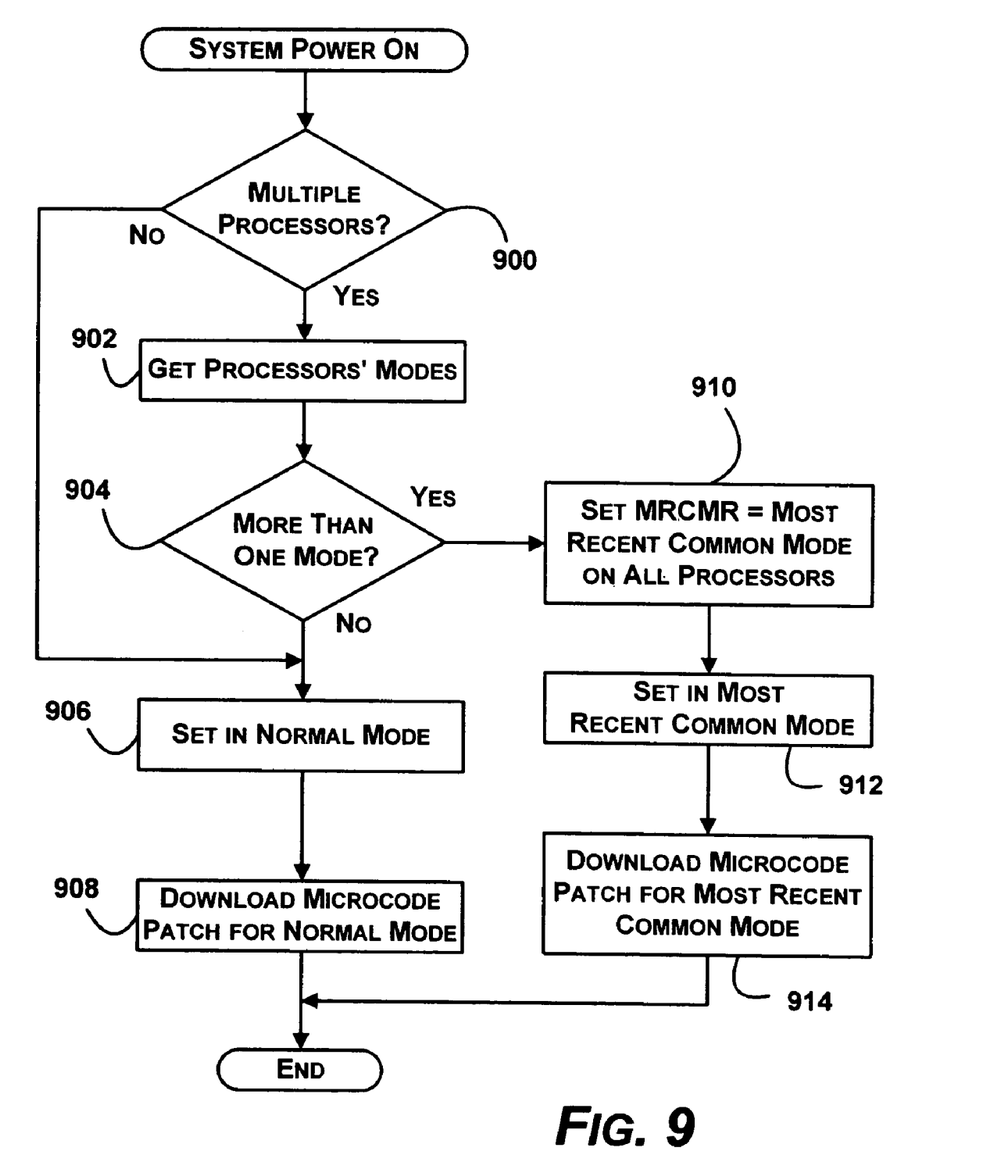
FIG. 9 is a flow diagram generally representing the steps for setting multiple microprocessors to a most-recent common mode in accordance with one aspect of the present invention.

FIG. 9 shows a general overview of a process for setting multiple microprocessors to a most-recent common mode in accordance with an aspect of the present invention. As with the process shown in FIG. 8, the common mode mechanism 70 detects the presence of multiple microprocessors, and, if multiple microprocessors are present, detects the modes of the multiple microprocessors (steps 900 to 906). If the microprocessors each include the same normal mode, step 904 branches to step 906 where the microprocessors are set to operate in normal mode. A microcode patch for the normal mode is then downloaded to the microprocessors, if available (step 908).

If, however, the microprocessors include different normal modes, then step 904 branches to step 910 where the microprocessors are set to run in the most-recent mode that is common among the microprocessors. In the example above, this function was accomplished by setting a most-recent common mode registry to a value (e.g., two) that is recognized by the microprocessors and corresponds to the most-recent common mode. The microprocessors then run in the most-recent common mode indicated by the value (step 912). A microcode patch for the most-recent common mode is then downloaded to the microprocessors, if available (step 914).

If desired, the operating system 35 may serve as a double check to determine whether or not all microprocessors in a system are operating in the same mode. To perform this function, the operating system 35 may include a mechanism similar to the common mode mechanism 70, which detects the presence of multiple microprocessors and the modes of the microprocessors, and, if necessary, sets all the modes to a common mode. If desired, the operating system 35 may override mode settings by the common mode mechanisms 70.

As can be readily appreciated, the various aspects of the present invention are not limited to microprocessors that serve as CPUs, but also work with other types of computing elements, including Graphics Processing Units, Programmable Logic Arrays, Digital Signal Processors and the like. Each of these types of computing elements may likewise use an intermediary mechanism to adjust their operating mode for better operation with one another. Thus, FIGS. 3-9 apply to these types of computing elements as well.

Figure 10:
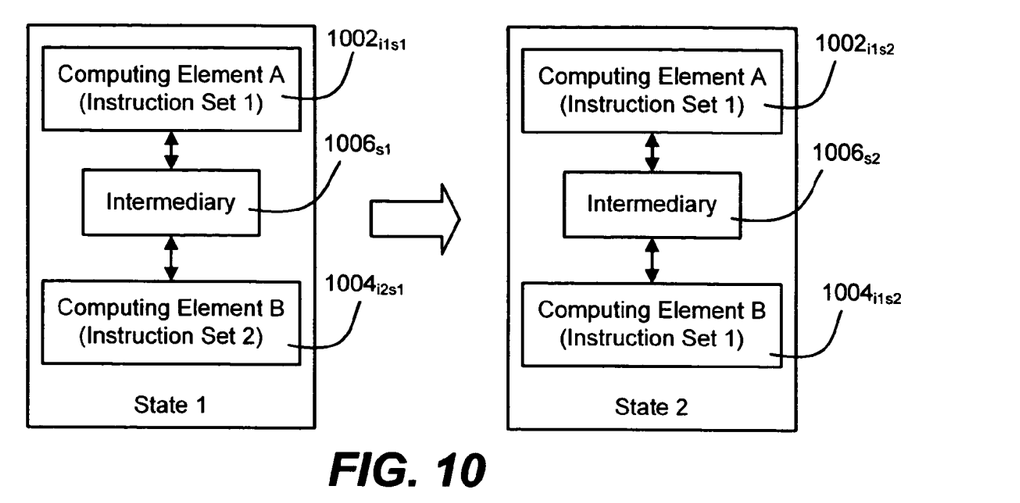
FIGS. 10 and 11 are representations of microprocessors being set to a corresponding instruction set mode in accordance with various aspects of the present invention.

Moreover, the various operating modes are not only changeable with respect to steppings. For example, certain microprocessors are able to operate in other types of modes, such as running another instruction set, e.g., a processor with a 64-bit instruction set may be set to run in a 32-bit instruction set mode. FIG. 10 shows how this may be accomplished in a computing environment with multiple computing elements $1002_{i1s1}$ and $1004_{i2s1}$, where the numeral following the "i" subscript represents the current instruction set mode, and the numeral following the "s" subscript mode means the current state in time. Thus in a first state, computing element A $1002_{i1s1}$ is running with a first instruction set i1, while computing element B $1004_{i2s1}$ is running with a second instruction set i2.

As described above, an intermediary mechanism $1006_{s1}$, such as system firmware $1006_{s1}$ in the form of ROM and/or registers, or code run on another processor (or on one or both of the two computing elements), determines a mode of operation for each processor that provides some benefit to the computing environment and sets the modes accordingly. To this end, the intermediary mechanism may include a detection mechanism to detect mode differences, and an instruction mechanism that changes the mode or modes so that they correspond as desired. Alternatively, the intermediary mechanism can be manually set by a developer or the like, such as BIOS settings, so that the computing elements run according to the developer's commands.

By way of example, running two processors each in a 32-bit mode may be more efficient or more stable than running one processor in a 64-bit mode and another in a 32-bit mode. This would allow two processors of different families, e.g., an x86 processor that can only run in a 32-bit mode, a 64-bit-capble Itanium processor that can instead run in a 32-bit mode to be efficiently mixed in a system. Alternatively, given a 64-bit processor and a 32-bit processor in the same system, with the a 64-bit processor configured as a computing processor and the 32-bit processor handling input/output (I/O), the 32-bit processor may be reconfigured for use as a computing processor, essentially changing its function within the system.

Thus, in the example of FIG. 10, in a second state, the computing element A $1002_{i1s2}$ continues to run with the first instruction set i1, while the computing element B $1004_{i1s2}$ has been changed via the intermediary (which may comprise itself to an extent) to run with the first instruction set i1. The intermediary $1006_{s2}$ may be still present, but is shown as shaded in the second state since it is not needed until another mode change. Thus, the operating modes of these two processors, although not necessarily identical in all aspects, correspond with respect to the type of instruction set being run, namely each operate with a 32-bit instruction set. Note that in any such processor, the change in an instruction set operating mode may also be accompanied by a change in mode to match a stepping, e.g., a computing element may change from instruction set 2, stepping 1 to instruction set 1, stepping 3.

Figure 11:
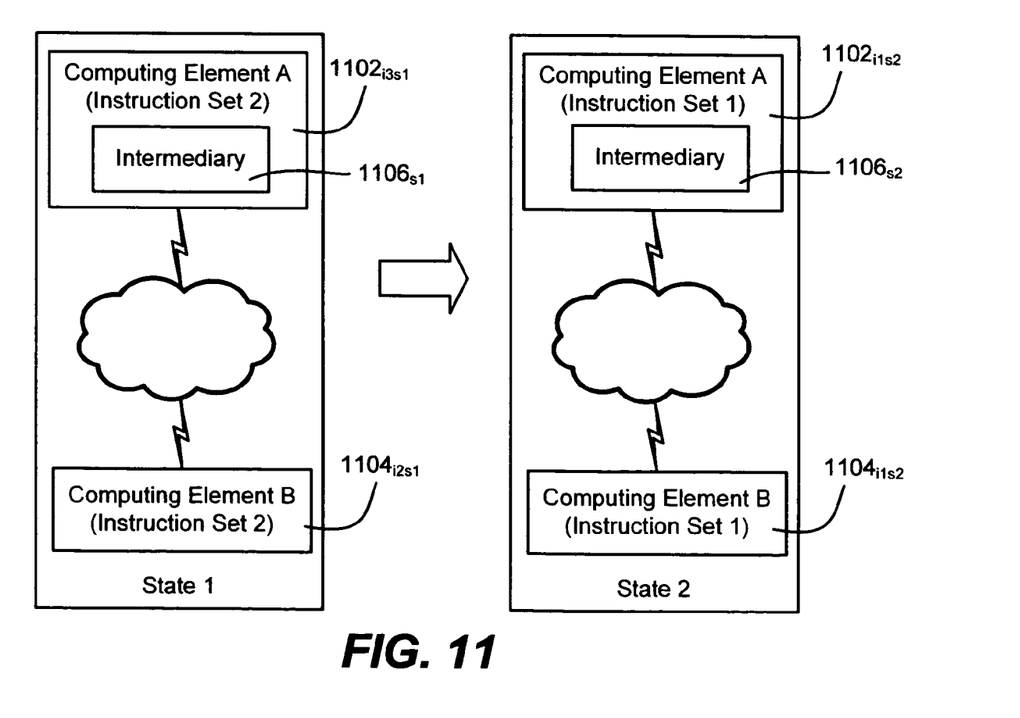

As can be readily appreciated, the present invention may be extended to computing elements separated and connected via a network connection, or some channel-based architecture, such as in a distributed computing environment. FIG. 11 shows one possible configuration, in which the intermediary $1106_{s1}$ is within a first (e.g., master) computing element A labeled $1102_{i3s1}$ that runs with a third instruction set. A second computing element B, labeled $1104_{i2s1}$, runs with a second instruction set. The intermediary changes the first computing element and the second computing element to run with a first instruction set. Note that depending on the hardware, it may not be necessary to re-boot the processors to change their modes, but if so, each processor that needs to re-boot can write an appropriate operating mode (value or values) to a register or the like and re-boot into the correct mode based on the value or values.

Figure 12:
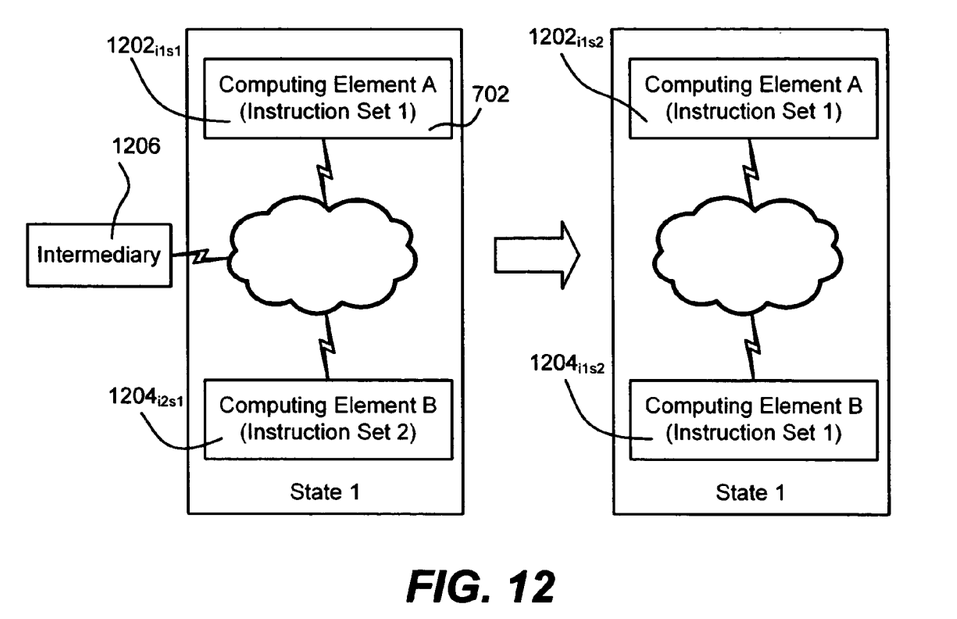
FIGS. 12 and 13 are representations of widely-separated microprocessors being set to a corresponding instruction set mode in accordance with various aspects of the present invention.

FIG. 12 shows an alternative arrangement in which the intermediary mechanism 1206 is external to the computing elements 1202 and 1204, such as running on a server, as a web service, or operating on some other network entity. Again, the intermediary 1206 detects/collects the differences and adjusts one or both of the operating modes such that the computing elements interoperate in some corresponding mode, such as with compatible instruction sets. As is understood, other types of modes may be changed instead of or in addition to instruction sets, e.g., a change to match steppings or a change to some other operating mode may be made.

It can be readily appreciated that a combination of a multi-processor system and distributed processor system may be employed in a manner that matches operating modes. For example, within a unitary multiprocessor computer system, processor A may instruct processor B to run in some operating mode so as to correspond to an operating mode of a remotely separated processor, processor X.

In accordance with another aspect of the invention, not only may computing elements of the same type be changed in mode to correspond to one or more others, but one type of computing element may be changed to correspond to a completely different type of computing element. For example, a CPU may change a mode to better match a graphic processing unit, or vice-versa. Other computing elements such as digital signal processors, programmable gate arrays, programmable logic arrays and so on may also change modes and/or cause a CPU to change modes. If at least one mode of at least one computing element can be changed, as long as some intermediary mechanism (or mechanisms) acts as a collector/detector of the various mode information, makes a decision as to a mode change, and successfully instructs the mode or modes to change, improved computing may be achieved.

Figure 13:
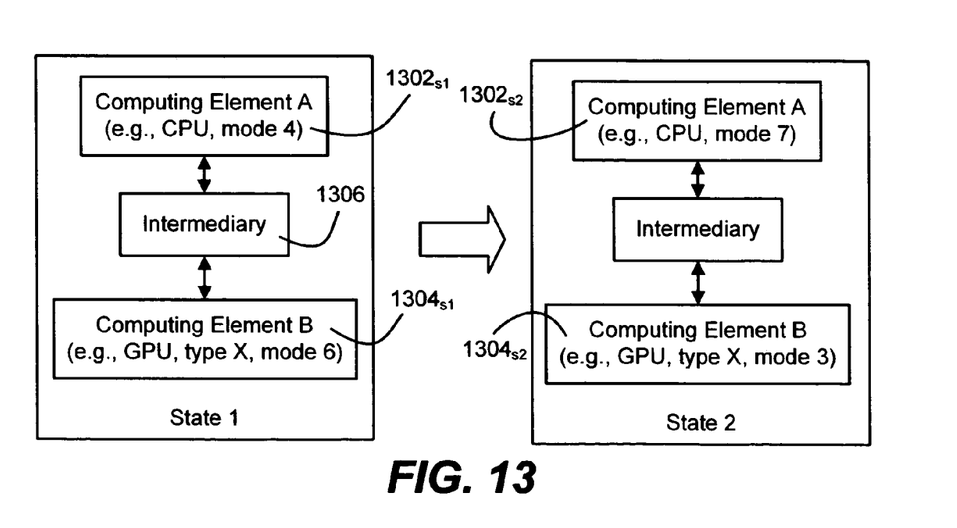

FIG. 13 shows an example of such a change, in which a computing element A 1302, such as in the form of a CPU, changes its operating mode based on the type and/or mode of a graphics processing unit 1304. Note that in the second state, the graphics processing unit 1304 has also changed its mode. A table (or tables) or the like accessible to the intermediary 1306 may be used to determine which CPU operating mode works best with which graphics processing unit type and/or mode.

By way of example, a CPU may include at least some subset of a graphics processor instruction set, (and/or vice-versa), for example to reduce the load on the graphics processor with complex graphics. A mode change is appropriate to have the instruction sets correspond. In another example model, CPUs have streaming types of instructions embedded in them to complement the processing done by the graphics processing unit. A mode change (stepping or instruction set) may be necessary to match the CPU to the graphics processing unit depending on its type.

Figure 14:
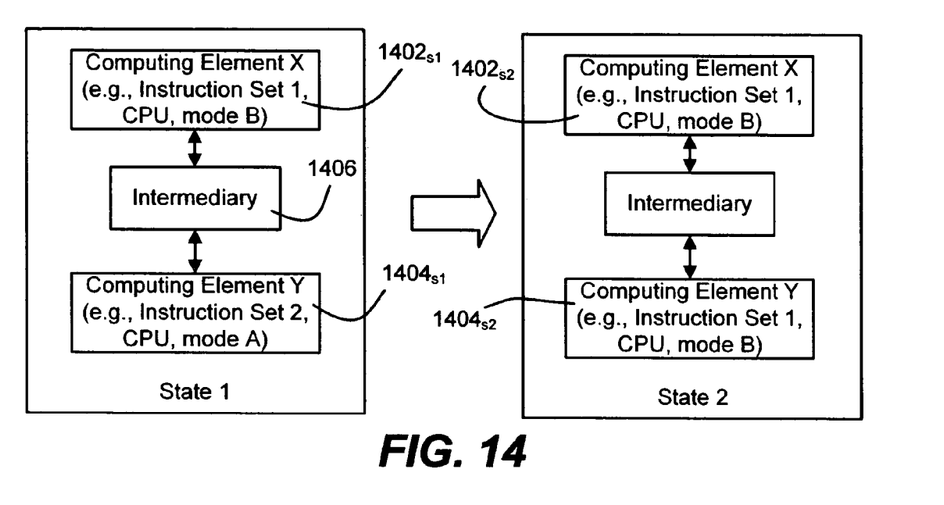
FIG. 14 is a representation of a microprocessors being set to a corresponding instruction set mode and other mode in accordance with various aspects of the present invention.

FIG. 14 shows how one computing element changes both its instruction set and at least one other operating mode (e.g., a stepping). To this end, a first computing element X $1402_{s1}$ operates with a first instruction set "1" in a mode "B" while a second computing element Y $1404_{s1}$ operates with a second instruction set "2" in a mode "A." Following a mode/state change via an intermediary mechanism 1406, the second computing element X $1404_{s2}$ operates with the first instruction set "1" in the "B" mode, to correspond to the first computing element's mode and instruction set.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing environment including a plurality of computing elements and an intermediary mechanism, each computing element including internal components configured for operation in one or more different operating modes, a method for adjusting an operating mode to improve interoperability between the computing elements, the method comprising:

the intermediary mechanism communicating with a first computing element to detect one or more available operating modes available to the first computing element;

the intermediary mechanism communicating with a second computing element to detect a current operating mode of the second computing element; and the intermediary mechanism communicating with the first computing element to alter a setting in the internal components of the first computing element to utilize a design alteration of the first computing element, utilization of the design alteration causing the first computing element to operate in a corresponding available operating mode that improves interoperability between the first computing element and the current operating mode of the second computing element.

2. The method of claim 1 further comprising, changing a mode on at least one other computing element to improve interoperability with the current operating mode of the second computing element.

3. The method of claim 1 wherein altering a setting in the internal components of the first computing element comprises changing the first computing element to operate with another stepping.

4. The method of claim 1 wherein altering a setting in the internal components of first computing element comprises changing the first computing element to operate with another instruction set.

5. The method of claim 4 wherein altering a setting in the internal components of the first computing element comprises changing the first computing element to operate with another stepping.

6. The method of claim 1 wherein the first computing element comprises a central processing unit and the second computing element comprises a graphics processing unit.

7. The method of claim 1 wherein the first computing element comprises a digital signal processing unit.

8. The method of claim 1 wherein the first computing element comprises a programmable gate array.

9. The method of claim 1 further comprising changing a mode on the second computing element.

10. The method of claim 1 wherein altering a setting in the internal components of the first computing element comprises communicating a message to the first computing element over a network.

11. The method of claim 1 wherein altering a setting in the internal components of the first computing element comprises changing a processor that primarily handles input/output operations to a processor that primarily handles computational operations.

12. At least one computer-readable medium having computer-executable instructions which when executed perform the method of claim 1.

13. In a computing environment, a system comprising:
a computer network;
a plurality of processors connected to the computer network, each processor having internal components configured for operation in one or more different operating modes; and
an intermediary mechanism connected to the computer network, the intermediary mechanism configured to determine through the exchange network communication with a first processor and a second processor common operating mode that is available to each of the first processor and second processor, the intermediary mechanism being further configured to alter settings of internal components of the first and second processors through network communication to cause the first and second processors to operate in the common operating mode.

14. The system of claim 13, wherein the intermediary mechanism writes information to at least one register.

15. The system of claim 13, wherein the intermediary mechanism comprises a web service.

16. The system of claim 13 further comprising at least one other computing element having a changeable mode caused to be changed by the intermediary mechanism to improve interoperation with the common operating mode of the first and second processors.

17. The system of claim 13 wherein the intermediary mechanism causes the first processor to operate with another stepping.

18. The system of claim 13 wherein the intermediary mechanism causes the first processor to operate with another instruction set.

19. The system of claim 18 wherein the intermediary mechanism causes the first processor to operate with another stepping.

20. The system of claim 13 wherein the first processor comprises a central processing unit and the second processor comprises a graphics processing unit.

21. The system of claim 13 wherein the first processor comprises a digital signal processing unit.

22. The system of claim 13 wherein the first processor comprises a programmable gate array.

23. The system of claim 13 wherein the intermediary mechanism causes a mode change to the second processor.

24. The system of claim 13 wherein the first processor is changed from a mode that primarily handles input/output operations to a mode that primarily handles computational operations.

25. In a computing environment including plurality of computing elements and an intermediary mechanism, each computing element including internal components configured for operation in one or more different operating modes, a method for adjusting the operating modes of the plurality of computing elements to improve interoperability between the computing elements, the method comprising:
the intermediary mechanism communicating with a first computing element to detect one or more operating modes available to the first computing element;
the intermediary mechanism communicating with a second computing element to detect one or more operating modes available to the second computing element; and
the intermediary mechanism communicating with the first and second computing elements to alter a setting in the internal components of at least one of the first computing element and the second computing element to utilize a corresponding design alteration, utilization of the design alteration to the corresponding computing element synchronizing the operating modes of the first computing element and the second computing element to enhance interoperability between the first computing element and second computing element.

26. The method of claim 25 wherein synchronizing the modes comprises changing an instruction set.

27. The method of claim 25 wherein the first computing element comprises a microprocessor, and wherein synchronizing the modes comprises causing the microprocessor to run with a different stepping.

28. The method of claim 25 wherein the first computing element communicates with the second computing element via a network.

29. At least one computer-readable medium having computer-executable instructions which when executed perform the method of claim 1.

30. The method of claim 1 wherein the computing environment includes a computer network and the intermediary mechanism communicating with a first computing element to detect one or more available operating modes available to the first computing element comprises the intermediary mechanism exchanging network communication with a first computing element to detect one or more available operating modes available to the first computing element.

31. The method of claim 30 wherein the intermediary mechanism communicating with a second computing element to detect a current operating mode of the second computing element comprises the intermediary mechanism exchanging network communication with the second computing element to detect a current operating mode of the second computing element.

32. The method of claim 31 wherein the intermediary mechanism communicating with the first computing element to alter a setting in the internal components of the first computing element to utilize a design alteration of the first computing element comprises the intermediary mechanism exchanging network communication with the first computing element to alter a setting in the internal components of the first computing element to utilize a design alteration of first computing element.

33. The method of claim 25 wherein the computing environment includes a computer network and the intermediary mechanism communicating with a first computing element to detect one or more available operating modes available to the first computing element comprises the intermediary mechanism exchanging network communication with a first computing element to detect one or more available operating modes available to the first computing element.

34. The method of claim 33 wherein the intermediary mechanism communicating with a second computing element to detect one or more operating modes of the second computing element comprises the intermediary mechanism exchanging network communication with the second computing element to detect one or more operating modes of the second computing element.

35. The method of claim 34 wherein the intermediary mechanism communicating with the first and second computing elements to alter a setting in the internal components of at least one of the first computing element and the second computing element to utilize a corresponding design alteration comprises the intermediary mechanism exchanging network communication with the first and second computing elements to alter a setting in the internal components of at least one of the first computing element and the second computing element to utilize a corresponding design alteration.

* * * * *